US009940689B2

(12) United States Patent
Dunn

(10) Patent No.: US 9,940,689 B2
(45) Date of Patent: Apr. 10, 2018

(54) LATENCY-RESISTANT SPARSE SIMULATION TECHNIQUE, SYSTEM AND METHOD

(71) Applicant: Nvidia Corporation, Santa Clara, CA (US)

(72) Inventor: Alex Dunn, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 137 days.

(21) Appl. No.: 14/930,135

(22) Filed: Nov. 2, 2015

(65) Prior Publication Data

US 2017/0124679 A1 May 4, 2017

(51) Int. Cl.
| | |
|---|---|
| *G06T 1/20* | (2006.01) |
| *G06T 1/60* | (2006.01) |
| *G06T 15/00* | (2011.01) |
| *G06T 15/08* | (2011.01) |
| *G06T 11/40* | (2006.01) |
| *G06T 13/60* | (2011.01) |

(52) U.S. Cl.
CPC ............... *G06T 1/60* (2013.01); *G06T 1/20* (2013.01); *G06T 11/40* (2013.01); *G06T 13/60* (2013.01); *G06T 15/005* (2013.01); *G06T 15/08* (2013.01); *G06T 2210/24* (2013.01)

(58) Field of Classification Search
CPC ... G06T 1/20; G06T 1/60; G06T 11/40; G06T 13/60; G06T 15/005; G06T 15/08; G06T 2210/24
USPC .................................................. 345/419, 530
See application file for complete search history.

(56) References Cited

U.S. PATENT DOCUMENTS

| | | | |
|---|---|---|---|
| 5,548,694 A | 8/1996 | Frisken Gibson | |
| 6,292,194 B1 | 9/2001 | Powell, III | |
| 6,342,886 B1 | 1/2002 | Pfister et al. | |
| 7,948,485 B1 | 5/2011 | Larsen et al. | |
| 8,320,691 B2 | 11/2012 | Nakanishi | |
| 8,364,865 B2* | 1/2013 | Fleegal | G09G 5/39 345/418 |
| 8,452,721 B2* | 5/2013 | Cohen | G06F 3/04815 706/47 |
| 8,970,592 B1 | 3/2015 | Petterson | |
| 2009/0112526 A1 | 4/2009 | Kim et al. | |
| 2010/0045669 A1* | 2/2010 | Johnson | G06T 13/60 345/420 |
| 2010/0277484 A1* | 11/2010 | Arciuolo | G06T 1/20 345/502 |
| 2014/0002617 A1 | 1/2014 | Zhang et al. | |

(Continued)

OTHER PUBLICATIONS

Crane, K., et al., "Real-Time Simulation and Rendering of 3D Fluids," NVIDIA GPU Gems 3, 2008, 44 pages.

(Continued)

*Primary Examiner* — Jacinta M Crawford

(57) ABSTRACT

A Central Processing Unit (CPU), system and method of performing a Graphics Processing Unit (GPU) simulation of a fluid-like object in a grid-based simulation space are provided. In one embodiment, the method includes: (1) determining, by a CPU, a list of bricks in the simulation space that the fluid-like object would occupy in a future frame based on simulation data of a current frame and (2) updating, based on the list, a virtual table that maps portions of a GPU memory to tiled resources corresponding to the bricks before a simulation of said future frame.

20 Claims, 3 Drawing Sheets

(56) References Cited

U.S. PATENT DOCUMENTS

2017/0124679 A1 5/2017 Dunn
2017/0140569 A1 5/2017 Dunn

OTHER PUBLICATIONS

Green, S., "Volume Rendering for Games," Game Developers Conference, Mar. 7-11, 2005, 28 pages, San Francisco, CA.
Muller, M., et al., "Particle-Based Fluid Simulation for Interactive Applications," Eurographics/SIGGRAPH Symposium on Computer Animation, 2003, 7 pages.
Fedkiw, F., et al., "Visual Simulation of Smoke," ACM Siggraph, Aug. 12-17, 2001, 8 pages.
Gourlay, M., "Fluid Simulation for Video Games (part 2)," Jun. 15, 2009, 15 pages, Intel, https://software.intel.com/sites/default/files/m/1/c/e/0/1/FluidsForGames2.pdf.
Chentanez, N., et al., "Real-Time Eulerian Water Simulation Using a Restricted Tall Cell Grid," Nvidia, 2011, 10 pages, https://pdfs.semanticscholar.org/4bc1/6465f7459ecebc420f9aa5fe74cc4fe2b9ef.pdf.
Setaluri, R., et al., "SPGRID: A Sparse Paged Grid structure applied to adaptive smoke simulation," University of Wisconsin, 2014, 12 pages, http://pages.cs.wisc.edu/~sifakis/papers/SPGrid.pdf.
Crane, K., et al., "Chapter 30 Real-Time Simulation and Rendering of 3D Fluids," from the book GPU Gems 3, Aug. 2007, Nvidia, p. 633-675.
Green, S., "Volume Rendering for Games," Game Developers Conference, 2005, Nvidia Corporation, 28 pages, http://http.download.nvidia.com/developer/presentations/2005/GDC/Sponsored_Day/GDC_2005_VolumeRenderingForGames.pdf.
"Particle-Based Fluid Simulation for Interactive Application," Siggraph Symposium on Computer Animation, 2003, 24 pages.

* cited by examiner

LATENCY-RESISTANT SPARSE SIMULATION TECHNIQUE, SYSTEM AND METHOD

TECHNICAL FIELD

This application is directed, in general, to sparse volume rendering and, more specifically, to discretization of the simulation space of a 3D, grid-based, GPU simulation, in terms of memory and computation, using a coarse grained, CPU-based prediction algorithm.

BACKGROUND

Fluid simulation in games is quite common, e.g., liquid, smoke and fire effects. Typically fluid simulation effects are implemented as particle systems using a relatively simple equation of motion. Real-time fluid simulation offers a physics-based alternative to particle kinematics, where these effects can move and interact with the world in a much more realistic manner.

Conventionally, real-time fluid simulation techniques allocate and compute a fluid simulation across the full resolution of the grid. Unfortunately, a simulation across the full resolution of the grid is prone to suffer from the well-known "N-order" problem, where memory requirements and computational complexity become unmanageable at higher resolutions, even for modern GPUs.

It has been recognized that, especially in the case of a fluid simulation, not all of the samples collected using traditional approaches are necessary due to the sparse nature of fluid (i.e. the entire grid is rarely involved in the simulation). It is also recognized herein that by skipping over these unoccupied regions, an improved sparse volume simulation technique that enables high speed rendering of volumetric data at resolutions never computed before in real time may be realized.

SUMMARY

One aspect provides a method of performing a GPU simulation of a fluid-like object in a grid-based simulation space. In one embodiment, the method includes: (1) determining, by a CPU, a list of bricks in the simulation space that the fluid-like object would occupy in a future frame based on simulation data of a current frame and (2) updating, based on the list, a virtual table that maps portions of a GPU memory to tiled resources corresponding to the bricks before a simulation of the future frame.

Another aspect provides a system for performing a GPU simulation of a fluid-like object in a grid-based simulation space. In one embodiment, the system includes a CPU that is configured to determine a list of bricks in the simulation space that the fluid-like object would occupy in a future frame based on simulation data of a current frame and to update, based on the list, a virtual table that maps portions of a GPU memory to tiled resources corresponding to the bricks before a simulation of the future frame. The system further includes a GPU having the GPU memory and configured to provide the simulation data of the current frame to the CPU without causing a CPU-GPU synchronization point.

In yet another aspect provides a CPU for facilitating a GPU simulation of a fluid-like object in a grid-based simulation space. In one embodiment, the CPU includes a processor that is configured to determine a list of bricks in the simulation space that the fluid-like object would occupy in a future frame based on simulation data of a current frame and to update, based on the list, a virtual table that maps portions of a GPU memory to tiled resources corresponding to the bricks before a simulation of the future frame.

BRIEF DESCRIPTION

Reference is now made to the following descriptions taken in conjunction with the accompanying drawings, in which.

DETAILED DESCRIPTION

The concept of "bricking" may be introduced to skip unoccupied regions and compute only the occupied regions. Bricking divides a grid-based simulation space into multiple bricks, each brick being made of a plurality of neighboring cells in the simulation space. By continually identifying bricks that the simulated fluid would occupy and computing only those bricks, computing resources may be saved.

While bricking may reduce waste in computing resources, it does not help in reducing waste in memory consumption. One of the solutions may be using compressed storage, which stores offset for each brick as a list of brick (vector<brick>) using a volume/3D texture. This results in a good memory consumption as it requires allocating memory for bricks that are pertinent to the simulation.

But the compressed storage has its limitation as the list resource must be dynamically resized on the fly. The compressed storage is also limited in indirection, which is required for all cell lookups. This indirection is called software translation, and it is particularly bad in the case of a bilinear filtering operation that happens to straddle a brick corner. While there are some mitigating measures, e.g., padding each brick with one extra cell on each side and copying neighboring data into the padded cells before simulation, they have not proven to be effective.

It is recognized herein that for a simulation of a fluid-like object that sparsely occupies a simulation space, using a concept of tiled resources, e.g., volume tiled resources (VTR), may be useful because it would allow (1) the memory to be allocated for only select bricks and (2) the indirect cell lookup in accessing the GPU memory to be handled in hardware using a virtual table. But it is also recognized herein that using tiled resources may cause a CPU-GPU synchronization point because the mapping of the virtual table needs to be updated by a CPU.

Introduced herein are a novel technique for performing sparse fluid simulation called a Latency-Resistant Sparse Simulation (LRSS) technique and systems and methods based thereon. Various embodiments of the LRSS technique avoid CPU-GPU synchronization points by introducing latency in reading data back from the GPU (to ensure that the GPU has finished processing the requested data) and effectively overcome the latency by predicting the state of a sparse fluid simulation.

In one embodiment, the LRSS technique determines a list of bricks that a simulated fluid-like object would occupy for a given frame at least one frame before the given frame by using an extrapolation technique, e.g., an Euler integration, based on the physics of fluid. The LRSS technique then updates the virtual table that maps tiled resources corresponding to the bricks to the GPU memory using the list. As such, the LRSS technique takes a full advantage of tiled resources free from any of the associated limitations.

Figure 1:
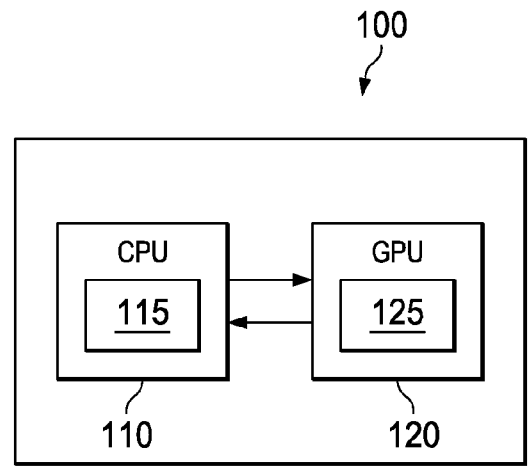
FIG. 1 is a block diagram of one embodiment of a system for performing a GPU simulation of a fluid like object in a grid-based simulation space.

FIG. 1 is a block of one embodiment of a system 100 for performing a GPU simulation of a fluid like object, e.g., liquid, smoke and fire, in a 3D, grid-based simulation space. The simulation space is made of a plurality of cells or volume elements (voxels). The simulation space is divided into a plurality of bricks, each of which includes a plurality of neighboring cells. Each brick corresponds to each different tile of tiled resources that is 64 KB in size. In one embodiment, VTR is used for tiled resources.

In the illustrated embodiment, the system 100 includes a Central Processing Unit (CPU) 110 and a Graphics Processing Unit (GPU) 120. While the CPU 110 and the GPU 120 are coupled to, and communicate with, one another, they are separate domains, optimized for unidirectional dataflow from the CPU 110 to the GPU 120. For this reason, receiving data back from the GPU 120 to the CPU 110 has been discouraged, because it creates an inter-domain dependency called a "synchronization point." In the illustrated embodiment, the system 100 does not cause a synchronization point by introducing latency in reading data back from the GPU.

The CPU 100 includes a processor 115. In the illustrated embodiment, the processor 115 is configured to determine a list of bricks in the simulation space that the fluid-like object would occupy in a future frame based on simulation data of a current frame. The processor 115 is further configured to update, based on the list, a virtual table that maps portions of a GPU memory 125 to tiled resources corresponding to the bricks before a simulation of the future frame. The future frame is a frame that is at least one frame ahead of time from the current frame. In the illustrated embodiment, the virtual table is maintained in hardware so indirect cell lookups can be handled in hardware, making it as simple as any paged memory read (which is any read on any resource on modern CPUs).

In one embodiment, the processor 115 determines the list of bricks for the future frame at least one frame before the future frame. In another embodiment, the processor 115 determines the list of bricks for the future frame at least two frames before the future frame. It is understood that the lists of bricks for the future frames may be determined well before the future frame based on the fluidity (i.e. viscosity) of the simulation object. It is also understood that determining the list of bricks ahead of time allows the mapping of the virtual table for the future frame to be updated on time, i.e. before the simulation of the future frame begins.

The GPU 120 includes the GPU memory 125. In the illustrated embodiment, The GPU 120 is configured to provide simulation data of each simulated frame, including the current and future frames, to the CPU 100 after the simulations of respective frames. This allows a prevention of a CPU-GPU synchronization point. The GPU 120 is further configured to allocate the tiled resources that correspond to the bricks in the list in respective portions of the GPU memory 125 for the future frame.

Figure 2:
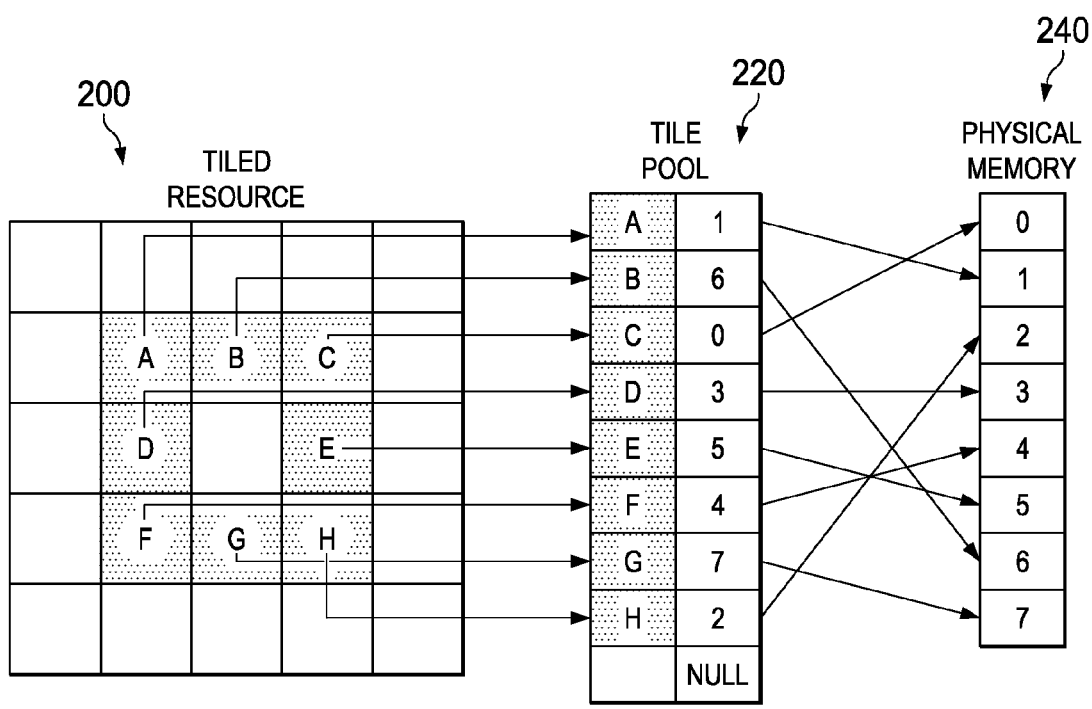
FIG. 2 is a two (2) dimensional representation of the grid-based simulation space using tiled resources.

FIG. 2 is a two-dimensional (2D) representation of bricks/tiles in a 3D, grid-based simulation space 200 mapped to portions of a GPU memory. In the illustrated embodiment, tiled resources are a high-level abstraction of the paged memory model used in modern GPUs. The GPU (physical) memory is allocated in pages, and virtual address tables (pointers in C++ terms) allow indexing of the hardware pages.

In the illustrated embodiment, the simulation space 200 is divided into twenty-five (25) equal-sized bricks. Each brick has a dimension of 32×16×16 and a size of 64 KB. In the illustrated embodiment, the simulated object, e.g., fluid, would only occupy bricks corresponding to tiles A, B, C, D, E, F, G, and H of the simulation space 200 in a given frame due to its sparsity. As such, only those bricks/tiles are selected and mapped to the GPU memory for the simulation.

Using a virtual address table 220, Tiles A, B, C, D, E, F, G, H are mapped to Portions 1, 6, 0, 3, 5, 4, 7, 2 of the GPU memory 240, respectively. As discussed above, the use of a virtual address table such as the table 220 allows the indirect cell lookup (addressing cells inside a brick) to be made simple as any paged memory read (which is any read on any resource on modern GPUs) and handled in hardware. Moreover, as the virtual table handles the difficult "corner cases" (as discussed above with the compressed storage) at the hardware level, it allows a speed of light memory access—something of high value in bandwidth-bound regimes.

Figure 3:
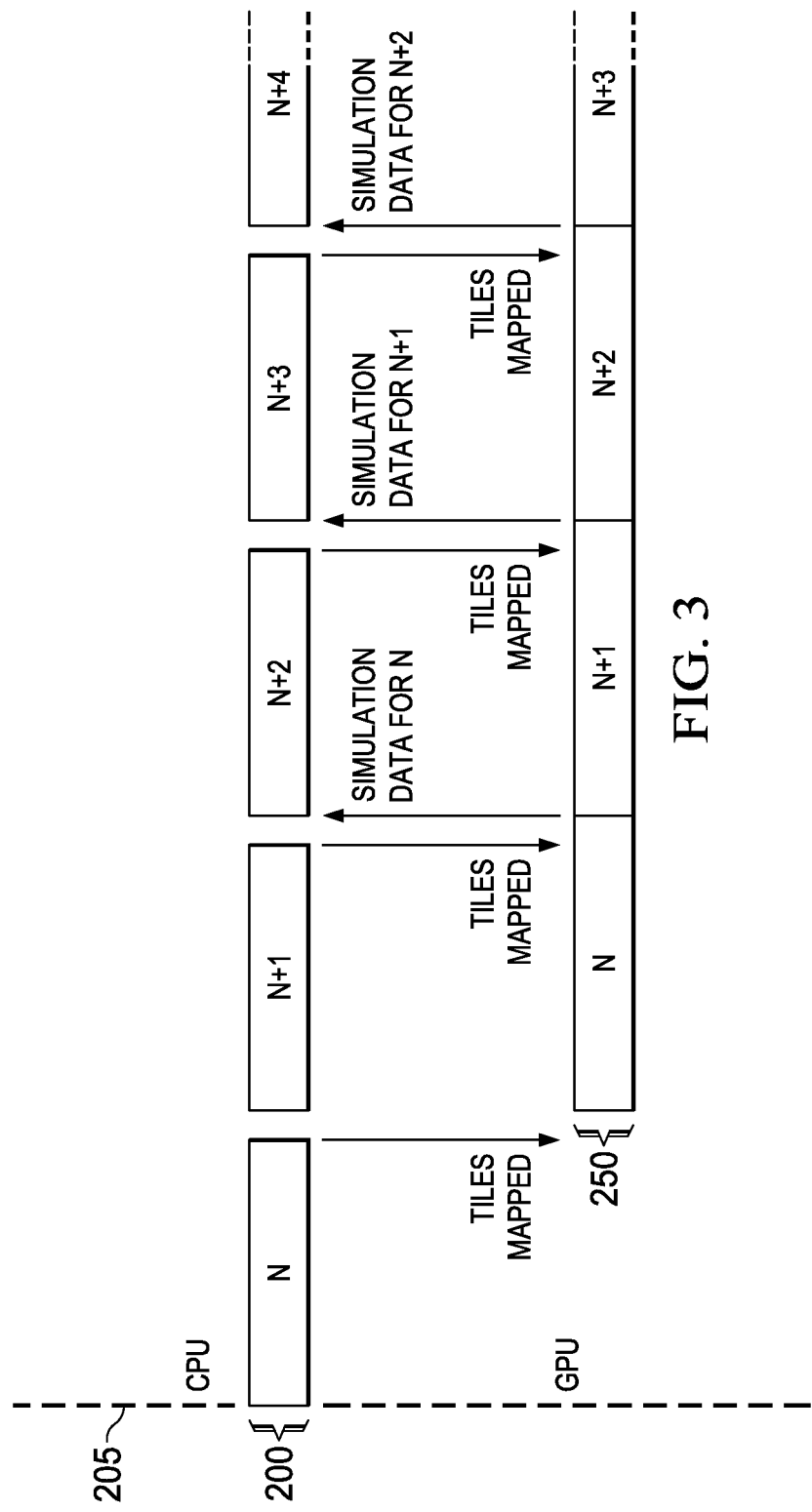
FIG. 3 is a diagram showing an access of GPU resident data from a CPU without causing a synchronization point.

FIG. 3 is a diagram showing an access of data resident in a GPU memory from a CPU without causing a synchronization point. Frames N, N+1, N+2, N+3, N+4 in a row 200 represents time blocks for the CPU determining a list of bricks of respective frames, and frames N, N+1, N+2, N+3, N+4 in a row 250 represents time blocks for the GPU simulating respective frames.

At the start 205 of the simulation process, the CPU first determines a list of bricks that the simulation object would occupy in frame N. As there is no simulation data available to read back from the GPU memory, the CPU determines the list of emitter bricks, bricks that overlap an emitter injecting the simulation object into the simulation space. Once the list is determined, the CPU updates the mapping of the virtual table that maps relevant portions of GPU memory to tiled resources that correspond to the emitter bricks.

Once the mapping of the virtual table is updated for frame N, the GPU starts to the simulation of frame N. During this time, the CPU also starts to determine a list of bricks for the next frame, N+1. Similar to frame N, as there is no simulation data available to read back from the GPU memory, the CPU again determines a list of emitter bricks for frame N+1.

Once the CPU determines the list of emitter bricks for frame N+1 and the GPU is finished with the simulation of frame N, the CPU updates the mapping of the virtual table for the simulation of frame N+1 based on that list. Unlike before, the simulation data is available to read back from the GPU memory. As such, the simulation data of frame N is requested and read back to the CPU. Using this data, the CPU starts determining a list of bricks that the simulation object would occupy in the next two frames, including frame N+2. At this time, the GPU also starts to simulate the next frame N+1.

Once the CPU has determined a list of bricks that the simulation object would occupy in frame N+2 and the GPU is finished the simulation of frame N+1, the CPU updates the mapping of the virtual table by requesting and reading back the simulation data for frame N+1. This allows the CPU to start determining a list of bricks for the next two frames, including frame N+3. At this time, the GPU also starts to simulate the next frame N+2.

Again, once the CPU has determined a list of bricks that the simulation object would occupy in frame N+3 and the GPU is finished the simulation of frame N+2, the CPU updates the mapping of the virtual table by requesting and reading back the simulation data for frame N+3. This allows the CPU to start determining a list of bricks for the next two frames, including frame N+4. At this time, the GPU also starts to simulate the next frame N+3. As the simulation expands, the above process is repeated for each successive frame.

In the illustrated embodiment, there is two frames latency (i.e. frames N and N+1 in the row 200) between the start of the simulation and the time the CPU first requests and reads the simulation data back from the GPU. This two frames latency ensures that when the CPU requests a read back, the GPU is finished processing the requested simulation data and thus, no CPU-GPU synchronization point is created.

Figure 4:
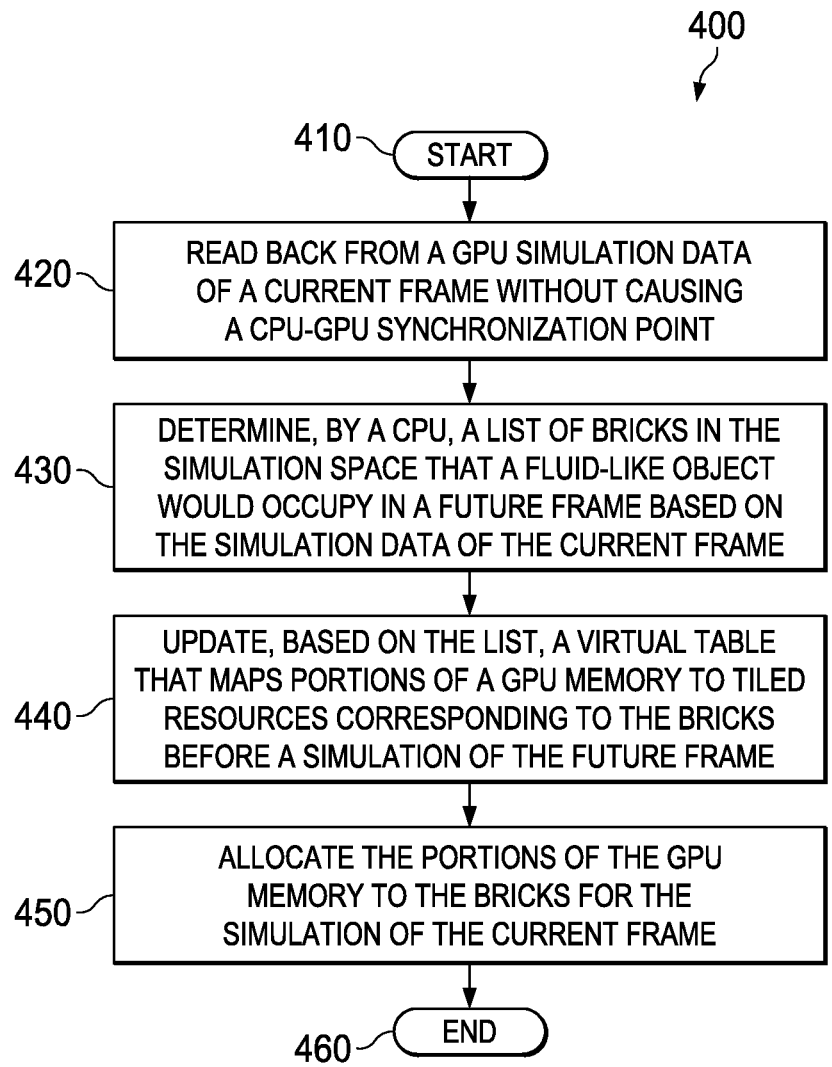
FIG. 4 is a flow diagram of one embodiment of a method of performing a GPU simulation of a fluid-like object in a grid-based simulation space.

FIG. 4 is a flow diagram of one embodiment of a method 400 of performing a GPU simulation of a fluid-like object, e.g., liquid, smoke and fire, in a 3D, grid-based, simulation space. The simulation space is made of a plurality of cells or voxels. For the simulation, the simulated space is divided into a plurality of bricks, each of which includes a plurality of neighboring cells. Each brick corresponds to each different tile of tiled resources that is 64 KB in size. In one embodiment, VTR is used for tiled resources. The method begins in a start step 310.

For the first few frames of simulation (based on the length of the introduced latency), there are not any meaningful simulation data for the CPU to read back from the GPU. As such, for those first few frames (before the current frame), the CPU updates the virtual table based on a list of bricks in the simulation space that overlap an emitter injecting the simulation object into the simulation space. In the illustrated embodiment, the virtual table is maintained in hardware so the indirect cell lookup can be handled in hardware. The method in a start step 410.

In a step 420, the simulation data of the current frame is read back from the GPU without causing a CPU-GPU synchronization point. This is achieved, as discussed above, by introducing a latency that allows the GPU to finish the simulation before the simulation data is read back. In the illustrated embodiment, the simulation data of the current frame is requested by the CPU.

In a step 430, based on the simulation data of the current frame, a list of bricks in the simulation space that the simulated fluid-like object would occupy in a future frame is determined. In the illustrated embodiment, the future frame is a frame that is at least one frame ahead of time from the current frame, and the list of bricks for the future frame is determined at least one frame before the future frame.

In one embodiment, the list of bricks may be determined using Eulerian integration that is based on the physics of fluid. In such an embodiment, a maximum velocity for each brick is calculated at the time of simulation, and this value is read back as part of the simulation data. This maximum velocity is then used for dead reckoning logic on the CPU which determines the following frames of probable simulation bricks and adds them to the list of definite bricks.

In a step 440, based on the list of bricks determined in the step 430, the virtual table that maps portions of the GPU memory to tile resources corresponding to the bricks is updated. In the illustrated embodiment, this step is carried out by the CPU before the simulation of the future frame.

In a step 450, the tiled resources that correspond to the bricks in the list are allocated in the respective portions of the GPU memory. The method end in an end step 460.

Below table shows the performance statistics of the illustrated method and the conventional, full-grid simulation across a variety of grid resolutions. The numbers are captured on a GeForce® GTX 980 video processor commercially available from Nvidia Corporation of Santa Clara, Calif., using a Windows® 10 operating system commercially available from Microsoft Corporation of Redmond, Wash.

TABLE

Comparative Performance Statistics

| | Grid Resolution | | | | |
|---|---|---|---|---|---|
| | $128^3$ | $256^3$ | $384^3$ | $512^3$ | $1,024^3$ |
| | Full Grid | | | | |
| Num. Bricks | 256 | 2048 | 6,912 | 16,384 | 131,072 |
| Memory (MB) | 80 | 640 | 2,160 | 5,120 | 40,960 |
| Simulation | 2.29 ms | 19.04 ms | 64.71 ms | NA | NA |
| | Sparse Grid | | | | |
| Num. Bricks | 36 | 146 | 183 | 266 | 443 |
| Memory (MB) | 11.25 | 45.63 | 57.19 | 83.13 | 138.44 |
| Simulation | 0.41 ms | 1.78 ms | 2.67 ms | 2.94 ms | 5.99 ms |
| Scaling Sim. | 78.14% | 76.46% | 75.01% | NA | NA |

As is evident from the above Table, the illustrated method embodiment provides a significant speed improvement and memory saving over the conventional, full grid method.

Those skilled in the art to which this application relates will appreciate that other and further additions, deletions, substitutions and modifications may be made to the described embodiments.

What is claimed is:

1. A method of performing a GPU simulation of a fluid-like object in a grid-based simulation space, comprising:
   determining, by a CPU, a list of bricks in said simulation space that said fluid-like object would occupy in a future frame based on simulation data of a current frame; and
   updating, based on said list, a virtual table that maps portions of a GPU memory to tiled resources corresponding to said bricks before a simulation of said future frame.

2. The method as recited in claim 1, further comprising allocating said tile resources that correspond to said bricks in said portions of the GPU memory for said simulation of said future frame.

3. The method as recited in claim 1, wherein each of said bricks includes a plurality of neighboring cells in said simulation space.

4. The method as recited in claim 1, wherein said virtual table is maintained in hardware.

5. The method as recited in claim 1, further comprising reading back from a GPU said simulation data of said current frame without causing a CPU-GPU synchronization point.

6. The method as recited in claim 1, wherein each tile of said tile resources is 64 KB in size.

7. The method as recited in claim 1, wherein said determining includes using an Euler integration.

8. The method as recited in claim 1, wherein said list of bricks includes probable bricks that said fluid-like object would likely occupy in said future frame and definite bricks that said fluid-like object would definitely occupy in said future frame.

9. The method as recited in claim 8, wherein said probable bricks are determined by a dead-reckoning logic in said CPU using a maximum velocity for each of said bricks.

10. The method as recited in claim 1, for said current frame, said virtual table is updated using a list of bricks that overlap an emitter.

11. The method as recited in claim 1, wherein said future frame is at least one frame behind said current frame.

12. A system for performing a GPU simulation of a fluid-like object in a grid based simulation space, comprising:
- a CPU configured to determine a list of bricks in said simulation space that said fluid-like object would occupy in a future frame based on simulation data of a current frame and update, based on said list, a virtual table that maps portions of a GPU memory to tiled resources corresponding to said bricks before a simulation of said future frame; and
- a GPU including said GPU memory and configured to provide said simulation data of said current frame to said CPU without causing a CPU-GPU synchronization point.

13. The system as recited in claim 12, wherein said GPU is further configured to allocate said tile resources that correspond to said bricks in portions of the GPU memory for said future frame.

14. The system as recited in claim 12, wherein each of said bricks includes a plurality of neighboring cells in said simulation space.

15. The system as recited in claim 12, wherein said virtual table is maintained in hardware.

16. The system as recited in claim 12, wherein each of said tile resources is 64 KB in size.

17. The system as recited in claim 12, wherein said list of bricks includes probable bricks that said fluid-like object would likely occupy in said future frame and definite bricks that said fluid-like object would definitely occupy in said future frame.

18. The system as recited in claim 17, wherein said probable brick are determined by a dead-reckoning logic in said CPU using a maximum velocity for each of said bricks.

19. The system as recited in claim 12, for a first frame of said GPU simulation, said virtual table is updated using a list of bricks that an emitter would occupy.

20. A CPU for facilitating a GPU simulation of a fluid-like object in a grid-based simulation space, comprising:
- a processor configured to determine a list of bricks in said simulation space that said fluid-like object would occupy in a future frame based on simulation data of a current frame and update, based on said list, a virtual table that maps portions of a GPU memory to tiled resources corresponding to said bricks before a simulation of said future frame.

* * * * *